United States Patent [19]

Hager

[11] 3,857,931

[45] Dec. 31, 1974

[54] LATEX POLYMER REAGENTS FOR DIAGNOSTIC TESTS

[75] Inventor: Hans Jacob Hager, New York, N.Y.

[73] Assignee: Hoffmann-La Roche Inc., Nutley, N.J.

[22] Filed: Jan. 17, 1972

[21] Appl. No.: 218,481

Related U.S. Application Data

[63] Continuation-in-part of Ser. No. 111,737, Feb. 1, 1971, abandoned.

[52] U.S. Cl................... 424/12, 260/8, 260/112 B, 260/112 R, 424/13, 424/78, 424/81, 424/85, 424/87, 424/92
[51] Int. Cl...................... G01n 31/06, G01n 33/16
[58] Field of Search.............. 424/3, 11, 12, 13, 78, 424/79, 81, 87, 92; 260/112 R, 112 B, 8

[56] References Cited
UNITED STATES PATENTS

| | | | |
|---|---|---|---|
| 3,502,545 | 3/1970 | Westman | 260/112 R |
| 3,639,558 | 2/1972 | Csizmas | 424/12 |
| 3,652,761 | 3/1972 | Weetall | 424/12 |
| 3,709,868 | 1/1973 | Spector | 424/12 X |
| 3,720,760 | 3/1973 | Bennich | 424/12 X |

FOREIGN PATENTS OR APPLICATIONS

| | | | |
|---|---|---|---|
| 1,172,768 | 12/1969 | Great Britain | 424/12 |
| 1,915,970 | 10/1969 | Great Britain | 424/12 |

OTHER PUBLICATIONS

Merrifield, JACS, Vol. 85, July 20, 1963 pp. 2149–2154.
Silman, Annual Rev. of Biochem., Vol. 35, pt 2, 1966, pp. 873–908.
Watt, British J. Vener. Dis., Vol. 47, 1971 pp. 448–450.
Goodfriend, Science, Vol. 144, June 12, 1964, pp. 1344–1346.

Primary Examiner—Albert T. Meyers
Assistant Examiner—A. P. Fagelson
Attorney, Agent, or Firm—Samuel L. Welt

[57] ABSTRACT

Diagnostically useful reagents formed by chemically combining a serologically determinant material to a polymeric carrier particle utilizing a water-soluble monocarbodiimide as a condensing agent as well as diagnostic methods utilizing the reagents are disclosed.

6 Claims, No Drawings

LATEX POLYMER REAGENTS FOR DIAGNOSTIC TESTS

RELATED APPLICATIONS

This application is a continuation-in-part application of U.S. Pat. application Ser. No. 111,737, filed Feb. 1, 1971, now abandoned the benefit of the filing date of which is hereby claimed.

BACKGROUND OF THE INVENTION

The diagnosis of pathological states or other conditions in human beings as well as animals is often accomplished by the application of immunological principles. These principles are utilized to determine the presence of antibodies or antigens in the body fluids of the subject. An antigen is a foreign substance, which, when introduced into the subject causes the production of certain soluble substances designated as antibodies. Any foreign substance, e.g., protein, which is not normally present in a given subject can cause the formation of antibodies when introduced into the subject under proper conditions.

The antibodies, after their formation, react with the antigen and thus, in the case of a microbial or viral invader, protect against infections.

Immunological testing procedures are based upon the antigen-antibody reaction which usually is manifested by an insolubilization or agglutination.

Generally, the presence of an antigen or antibody is confirmed or diagnosed by contacting the corresponding antibody or antigen with a body fluid of the subject, usually urine, blood serum or a specially treated blood extract, although other body fluids can also be used. The presence of the antibody or antigen in the subject is noted if an insoluble antigen-antibody complex forms.

Because some complexes form very slowly and have very small particle sizes, it is necessary to utilize carriers in order to make it possible to visually discern them. Among the carriers which have been employed are sheep and human erythrocytes, bacterial cells, bentonite, latex particles, e.g., polystyrene, anionic phenolic resins and finely divided diazotized amino cellulose.

The known carriers which physically bind serologically determinant materials are limited in their applicability and usefulness in immunological diagnostic procedures because they suffer from a number of disadvantages. Among the important disadvantages are in many instances a lack of sensitivity and in many cases poor stability. These defects are primarily due to the fact that when carrier particles are physically coated with the serologically reactive material an equilibrium between the free and associated material exists. This results in competitive inhibition between the free and the carrier bound antibody or antigen for the corresponding antigen or antibody. If an attempt is made to separate the free material from the associated material, a process which requires washing and filtering, losses of the physically coated material occur, drastically reducing the sensitivity of the test. Furthermore, many negatively charged proteins can not be physically coated to inert carrier particles, e.g., latex particles, without hydrolysis or enzymatic degradation. This treatment may result in conformational changes of structure which can be detrimental to the specificity of the reaction. Small peptides do not lend themselves, even under these conditions, to physical coating to inert polymers which limits the applicability of this procedure for many immunologic diagnostic tests.

There is thus a need for a carrier which is serologically inert and will form with a wide spectrum of serologically determinant materials a diagnostically useful reagent which is stable, specific, sensitive and provides an easily ascertainable visual evaluation in a minimum of time.

SUMMARY OF THE INVENTION

This invention relates to a process for forming diagnostically useful reagents comprising a polymeric carrier particle and a serologically determinant material. More specifically, this invention relates to a process of chemically combining a serologically inert latex polymeric carrier particle with a serologically determinant material by utilizing a water-soluble monocarbodiimide as a condensing agent. This invention further relates to stable diagnostically useful articles of manufacture, reagents and methods for utilizing the reagents in diagnostic tests.

DETAILED DESCRIPTION OF THE INVENTION

It has been discovered that many serologically determinant materials, e.g., polysaccharides, intact protein molecules and peptides, which previously could not be satisfactorily physically attached to polymeric latex carriers, can be covalently linked by the formation of an amide bond to a certain group of serologically inert, latex polymeric carriers by chemical means.

The phrase "serologically determinant materials" as used in the context of this invention refers to those materials which can be determined in human and animal body fluids by utilization of immunological principles. This invention comprehends within its scope all those serologically determinant materials which can be chemically linked by the formation of an amide bond to a serologically inert latex carrier particle, using a carbodiimide condensing agent.

Typical suitable serologically determinant materials are isolated human and animal antibodies, serum components, toxins, bacterial and viral components, hormones, enzymes, alkaloids, cellular and tissue extracts, small molecular weight substances, e.g., insulin, angiotension and urokinase, and the like. Specific representative materials which are eminently suitable for use in diagnostic tests are human chorionic gonadotropin, human gamma globulin and human albumin.

The amount of serologically determinant material linked to the serologically inert latex polymeric carriers is usually from about 0.01 to 15.0% by weight. However, each particular serologically determinant material is utilized in an amount in which it is most successfully employed in a diagnostic test, therefore, each material is combined with the carrier in a ratio suitable for its specific requirements. This invention therefore comprehends within its scope the use of an amount of serologically determinant material in combination with a serologically inert latex polymeric carrier sufficient to provide a diagnostically effective reagent.

As used within the context of this invention, "serologically inert latex polymers" or "serologically inert latex polymeric carrier particles" includes latex polymers which are water-insoluble, have a particle size in the range of from about 0.01 microns to about 0.9 microns, a specific gravity near that of water so that after coupling with the serologically determinant material, the specific gravity of the particles is about 1.0, enabling them to remain permanently in aqueous suspension; the particles must be inert with respect to immunological diagnostic tests, they also must have sufficient surface charge density so that when coupled to the serologically determinant material, their repulsive forces are enough to prevent aggregation and the particles must have active groups which are capable of forming an amide linkage with a serologically determinant material by the condensation of a primary or secondary amine group and a carboxyl group. Thus, the polymeric carriers can have either carboxyl groups, amine groups or groups convertible into them or any combination of these groups. Typical suitable groups on the polymeric carriers are those containing an active hydrogen, e.g., —COOH, —CONH$_2$, a nitrile group, a secondary amine group, a primary amine group or any combination thereof.

The chemical reaction forming the amide linkage is carried out according to this invention in the presence of a water-soluble carbodiimide condensing agent. The degree of coupling with the serologically determinant material by means of carbodiimides is dependent upon the density of the reactive groups in the polymer. The density of the reactive groups is not critical to the operability of this invention as long as a sufficient amount of reactive groups should be present to provide coupling of a sufficient amount of serologically determinant material to be useful in diagnostic tests.

Typical suitable carrier particles are those supplied commercially as an aqueous latex suspension, usually in concentrations of about 40 to about 60% solids. Many types of latex polymers are suitable for use in this invention provided they meet the criteria set forth above. This invention comprehends the use of all the suitable latexes.

Typical suitable latex polymers are carboxylated styrene butadienes, carboxylated polystyrenes, carboxylated polystyrenes with amino groups, acrylic acid polymers, methacrylic acid polymers, acrylonitrile butadiene styrenes, polyvinyl acetate acrylates, polyvinyl pyridines, vinyl chloride-acrylates and the like. Some commercially available latexes which are suitable for use in this invention are Amsco Res 4150, Amsco Res 3011 (American Mineral Spirits Co.); Dow Latex 815, Dow Latex 816, Dow Latex 620, Dow Latex 859 (The Dow Chemical Co.); Hycar 1512, Hycar 1877X8, Hycar 2600×120 (Goodrich Chemical Co.); Gelva 900, Lytron 612, Lytron 624 (Monsanto); Rhoplex LC40 3216, (Rohm and Haas).

According to this invention, the serologically determinant materials are covalently coupled to discrete particles of the carrier by utilizing as a condensing agent water-soluble monocarbodiimides represented by the formula

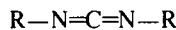

R—N=C=N—R wherein R is: cycloalkyl having from 5 to 6 carbon atoms in the ring; alkyl of from 2 to 12 carbon atoms, e.g., ethyl, n-propyl, isopropyl, n-butyl, sec.-butyl, isobutyl, tert.-butyl, amyl, hexyl, heptyl, octyl, nonyl, decyl, undecyl and dodecyl; monoarylsubstituted lower alkyl radicals, e.g., benzyl, α- and β-phenylethyl; monoaryl radicals, e.g., phenyl; morpholino; piperidyl; morpholinyl substituted lower alkyl radicals, e.g., ethyl morpholinyl; piperidyl substituted lower alkyl radicals, e.g., ethyl piperidyl; di-lower alkylamino; lower alkyl radicals; pyridyl substituted lower alkyl radicals, e.g., α, β and γ methyl or ethyl pyridyl; acid addition salts; and quaternary amines thereof.

The carbodiimides may be prepared in accordance with the general method of E. Schmidt, F. Hitzler and E. Lahde, Ber. 71, 1933 (1938) from the corresponding thioureas by oxidation with mercuric oxide in acetone. The thioureas may be prepared from the corresponding amine by reaction with carbon disulfide in the case of symmetrical thioureas. The unsymmetrical thioureas may be prepared by an amine with an isothiocyanate. The carbodiimides are also preparable from the corresponding ureas.

As stated above, water-soluble carbodiimides are most suitable for use in the present invention. If the carbodiimide bears a terminal amino group, it may be made water soluble by forming an acid addition salt with a hydrohalic acid, e.g., HCl, HBr or HI; sulfuric acid, sulfonic acids, nitric acid, phosphoric acid and phosphonic acids; also the tertiary amino groups can be made water soluble by quaternization with a suitable quaternization agent, e.g., methyl tosylate, methyl bromide, methyl iodide, benzyl bromide, ethyl iodide, ethyl bromide, benzyl iodide, ethyl tosylate, methyl sulfate, ethyl sulfate and the like.

All of the foregoing are examples of compounds which are suitable as condensing agents usseful in the practice of this invention.

The serologically determinant material and the carrier are reacted, according to this invention, in aqueous medium preferably at room temperature (about 20°C. to about 25°C.). Temperatures from about 5°C. to about 40°C., however, are suitable for the reaction. In order to insure a chemical coupling of the serologically determinant material to the carrier, a sufficient amount of condensing agent isi used to insure that all the available amide bonds are formed. Generally, about 0.05 to about 2.0% by weight of a water-soluble carbodiimide, based on the weight of the particles, is suitable, usually, however, about 1% by weight is used.

The pH of the reactions is important since it should not be such as will denature any protein reactants. Usually a pH of from about 5 to about 8.5 is suitable. This pH is maintained by the use of appropriate conventional buffer systems such as phosphate buffers or the like.

The reaction is completed in from about 5 minutes to about 24 hours. Generally, about 4 or 5 hours is sufficient.

The resulting product is a water-insoluble material suspended in an aqueous medium buffered to a pH of about 5.0 to 8.5 depending on the particular system used and the stability requirements of the serologically determinant material. The specific gravity of the product is about the same as water with the result that the suspension of the product is stable. The products can be isolated, e.g., by centrifugation, and are white, somewhat thixotropic viscous clay-like materials. Chemically, the product is a monolayer of serologically determinant material condensed to discrete particles of the serologically inert carrier by means of an amide linkage. The serologically determinant material in the product is a single active entity and any contaminants if present do not interfere with the specificity of the reaction.

All such products which are formed from the reactants which meet the criteria set forth above and which in themselves meet the criteria set forth above are comprehended by this invention.

As examples of specific products within the scope of this invention are human chorionic gonadotropin linked through an amide linkage to a carboxylated butadiene styrene copolymer containing a monomer ratio of 45% butadiene, 55% styrene and having a density of carboxyl groups which is about 1 to about 5%, usually about 3% by weight; human albumin linked through an amide linkage to a carboxylated butadiene styrene copolymer containing a monomer ratio of 45% butadiene, 55% styrene and having a density of carboxyl groups which is about 1 to about 5%, usually about 3% by weight; water-soluble cellular components from *Neisseria gonorrhoeae* linked through an amide linkage to a carboxylated butadiene styrene copolymer containing a monomer ratio of 45% butadiene, 55% styrene and having a density of carboxyl groups which is about 1 to about 5%, usually about 3% by weight.

Once the product is formed, it can be utilized in specific diagnostic tests utilizing immunological principles. It can be used in any convenient concentration depending on the specific test, however, concentrations of from about 1.0 to about 3.0% by weight are suitable and the preferred concentrations vary depending on the specific test, however, about 1.3 to about 2.5% by weight is generally preferred. Either a direct or indirect test can be performed, thus, for example, in an indirect test the product formed when human chorionic gonadotropin is coupled to the carrier particle can be used as a diagnostic reagent to determine if a woman is pregnant. This can be accomplished, for example, by placing a drop of test urine on a clean glass slide, mixing a drop of anti-human chorionic gonadotropin serum, then adding a drop of the HCG-carrier product in aqueous suspension. Within 2 minutes the results of the test are observed and are about 90–98% accurate.

The advantages of such a test are its simplicity, speed, specificity, accuracy and lack of false positives. This is because there is no interference from other proteins caused by non-specific layering.

As another example, in a direct test the product formed when gamma globulin is coupled to the carrier particle can be used as a diagnostic reagent to determine if a patient has rheumatoid arthritis. This can be accomplished, for example, by placing the buffered test sera on a glass slide and mixing in a drop of the gamma globulin-carrier reagent in an aqueous suspension. Within one minute, the results of the test are observed and are about 80% accurate.

In still another example of a direct test, the product formed when *N. gonorrhoeae* water soluble cellular components are coupled to the carrier particle can be used as a diagnostic reagent to determine if a patient has gonorrhea. This can be accomplished, for example, by placing a drop (about 0.05 ml.) of buffered test sera on a glass slide and mixing with a drop (about 0.05 ml.) of the antigen-carrier reagent in an aqueous suspension. Within 2 to 3 minutes the results of the test are observed. In this particular test extracts or fractions from growth phases of *N. gonorrhoeae* known as $T_1$ or $T_4$ are suitable. The antigen-carrier reagent yields positive reactions with human sera from patients known to have had infections with *N. gonorrhoeae*. The positive result is apparent by observable agglutinates. Sera from individuals known to be free from infection generally give negative results with an occasional positive result.

The reagent materials useful in the immunological testing procedures can conveniently be packaged for commercial purposes, e.g., in a diagnostic reagent kit containing two separate containers, one with the appropriate antiserum and the other containing in aqueous suspension, the serologically determinant material linked to the serologically inert carrier through an amide bond or, if a direct test is used, only one container with an aqueous suspension of the serologically determinant material linked to the serologically inert carrier through an amide bond. The concentration of the aqueous suspension of the serologically determinant material linked to the serologically inert carrier through an amide bond can be any convenient concentration. However, from about 1.0 to about 2.5% by weight is preferred.

The following examples illustrate the invention.

EXAMPLE 1 a. 377,000 I.U. of human chorionic gonadotropin (HCG) powder are dissolved in 65 ml. of sterile saline and heated for 1 hour at 80°C., then cooled to room temperature. 60 ml. of the cooled HCG solution are poured rapidly into a reaction flask containing 300 ml. of a carboxylated styrene butadiene (Dow No. 816) latex having a pH of 9.3, a specific gravity of 1.030 and a viscosity of 100 cps. using a Brookfield No. 1 at 20 rpm. The concentration of the latex is adjusted to 78–82 mgm./ml. As soon as the HCG is dispersed evenly in the latex, 1.8 gms. 1-cyclohexyl-3-[b 2- morpholinyl-(4)-ethyl]-carbodiimide metho-p-toluenesulfonate dissolved in 180 ml. of water are added. The reactants are mixed for 2 hours at room temperature, then centrifuged at 25,000 × g at 10°C.

The supernatants are poured off and the resulting latex pellets are milled in about 400 ml. of water for about 10 minutes and centrifuged for about 1.5 hours at 25,000 × g at 10°C. The supernatant is then discarded and the pellets are resuspended in 400 ml. of buffer at pH 8.2 containing 0.1 M Tris-HCl, 0.85 percent NaCl and 0.1 M ε-amino-n-caproic acid. The buffered mixture is milled and centrifuged for 1.5 hours at 25,000 × g at 10°C. The supernatant is poured off and the latex pellets are recovered. The pellets have particles of an average size of about 0.20–0.25 μ, contain 0.75 percent of HCG by weight, and have a specific gravity of 1.01.

The product is suitable for packaging into a diagnostic reagent test kit having two containers, one of which contains the buffered HCG-carrier reagent and the other contains the anti-HCG serum reagent. Suitable concentrations and amounts of reagents in the containers in a kit are 2.2 ml. of the HCG-carrier reagent at a concentration of 13.5 mgm./ml. in a buffer at pH 8.2 composed of Tris-HCl, NaCl and ε-amino-n-caproic acid and 0.01 percent Thimersal. The anti-HCG serum is diluted approximately 1:60 in a buffer solution at pH 7.9–8.2 containing 0.1 M tris, 0.85 percent NaCl, 0.1 M ε-amino-n-caproic acid, 1 percent Bovine albumin and 0.1 percent $NaH_2$.

The anti-HCG serum is derived from rabbits by means well known to the art. Thus, rabbits are immunized with HCG, then the anti-serum is collected, tested for titer, then stored for use.

EXAMPLE 2

2 ml. of a 6 percent human albumin suspension is diluted in 50 ml. of distilled water and stirred for 10 minutes. 8 ml. of carboxylated butadiene styrene copolymer, 50 percent solids (Dow 816) are added followed by the addition of 37 ml. of 0.1 M phosphate buffer at pH 5.5 and the mixture is stirred for 10 minutes. 160 ml. of 1 percent aqueous 1-cyclohexyl-3-[2-morpholinyl-(4)-ethyl]-carbodiimide metho-p-toluenesulfonate is added. The reaction mixture is stirred overnight at room temperature. The product is recovered by centrifugation. It is a white clay-like mass composed of particles having a particle size of about $0.2\mu$, a specific gravity of 1.01 and contains 10% human albumin by weight.

The product is suspended in saline solution buffered with 0.1 M Tris-HCl to a pH 7.2–7.4 and containing 0.1% carboxymethyl cellulose. This forms a milky white suspension suitable for packaging into diagnostic kits.

The product is packaged into a diagnostic reagent test kit having two containers, one of which contains an aqueous buffered albumin-carrier suspension of 1.8 mgm. per ml. and the other of which contains properly diluted goat antihuman albumin serum. Each container contains about 1 to 2 ml. of reagent.

The test for human albumin in meconium utilizing the reagents prepared according to Example 2 is carried out as follows:

2 ml. of antihuman albumin serum are delivered into a glass test tube, then 1 ml. of meconium solution (1:50 by volume) in saline is added with mixing and incubated at 37°C for 10 min. Two drops of the albumin-carrier suspension are then added with mixing. After one hour at 37°C., the results of the test are read; agglutination indicates less than $16\mu g/ml$. albumin present in the meconium and non-agglutination indicates albumin at levels of $16\mu g/ml$. or higher. This level of human albumin in the meconiums is abnormally high and further tests can then be run to determine the existence of an abnormal or diseased condition, e.g. cystic fibrosis.

EXAMPLE 3

Denatured gamma globulin is prepared by suspending Cohn Fraction II in distilled water to a 1% solution. The suspension is left to stand at room temperture overnight then centrifuged at 10,000 rpm. for 30 minutes. The supernatant is poured off and filtered thru Whatman No. 1 paper.

20 ml. of a 1:10 water suspension of acrylonitrile latex (Hycar-Latex 1571) is mixed with 20 ml. of denatured 1% gamma globulin prepared as above. 10 ml. of 1% aqueous 1-cyclohexyl-3-[2-morpholinyl-(4)-ethyl]-carbodiimide metho-p-toluenesulfonate are then added. The reaction mixture is heated in a 56°C. water bath for 10 minutes. The resulting suspension is centrifuged at 15,000 rpm. for 1 hour. The supernatant is poured off and the residue is resuspended in 50 ml. of 0.1 M Glycine-Saline buffer at pH 8.2. The suspension is again centrifuged and the residue, particles of a white clay-like material containing 0.01 to 1% gamma globulin and with an average particle size of about $0.09\ \mu$ and a specific gravity of 1.01, is recovered.

The gamma globulin-carrier particles are suspended in a 0.1 M Glycine-Saline buffer at pH 8.2 and utilized in a diagnostic immunological test for rheumatoid arthritis as follows:

50 Lambda of test sera are delivered onto a clean glass slide. One drop of 0.1 M Glycine-Saline buffer at pH 8.2 is added and mixed with a wooden applicator stick. Two drops of the prepared reagent are added and then the reagents are mixed again. The slide is tilted back and forth gently for 1 minute. The results of the test are then observed; an agglutination on the slide is indicative of a serum containing rheumatoid factor, non-agglutination denotes the serum is free from rheumatoid factor.

EXAMPLE 4 a. Water-soluble cellular components from *Neisseria gonorrhoeae* are produced as follows:

Strain F62 of *N. gonorrhoeae* is propagated on the surface of Difco GCB enriched agar medium, a nutrient medium having per 500 ml., 2% by weight defined supplement composed of 0.001 gram cocarboxylase, 0.5 gram glutamine, 20 grams dextrose in 100 ml. distilled $H_2O$ sterilized by filtration; 0.005% by weight of iron supplement composed of 0.2 gram of ferric nitrate . $9H_2O$ in 200 ml. of distilled water sterilized by filtration; and 5 ml. of VCN inhibitor composed of 1500 mcgm/500 ml. of vancomycin, 3750 mcgm/500 ml. of colistin and 6250 units/500 ml. of nystatin.

Standard Petri plates containing the agar medium are inoculated and incubated overnight at 35°C. in an atmosphere of 4–8% $CO_2$. At the end of the incubation period typical $T_1$ and $T_4$ colonial variants are carefully picked with the aid of a dissecting microscope and each colonial type is then inoculated onto the surface of a number of fresh agar plates and incubated as above.

Following overnight incubation, plates containing primarily $T_1$ or $T_4$ variants are selected for use in seeding 200 additional plates with each variant. The $T_1$ plates selected for use as the inoculum are examined with a dissecting microscope to insure that they contain less than 10% of $T_2$, $T_3$ or $T_4$ variant forms. 200 Plates are inoculated by carefully removing growth from the selected plates by gentle washing with 1–2 ml. amounts of physiological saline solution. The washings are pooled and diluted to a volume of 30 ml. in saline. Two drops (0.1 ml.) of the pooled inoculum are then added to the surface of each plate and spread over the surface by means of a sterile L-shaped glass rod. All plates are then incubated overnight at 35°C. in a 4–8% $CO_2$ atmosphere.

Following incubation, bacterial growth (inoculum) is recovered from the plates seeded with either the $T_1$ or $T_4$ variant by means of a sterile L-shaped rod and collected. The collected inoculum is then diluted to a volume of 25 ml. in water. Approximately 50% of the 25 ml. volume represents *N. gonorrhoeae* cells.

25 Ml. of the resulting cell suspension is placed in a X-press chamber (BioTec Instruments, Rockville, Maryland) and cooled to −25°C. in a dry ice-alcohol bath. The frozen cell suspension is then disrupted under 12,000 psi in the X-press (by this procedure, as judged by microscopic examination, approximately 95% of the gonococci are ruptured).

The resulting cell extract is recovered from the chamber, allowed to thaw to room temperature (24°C.) and then centrifuged at 16,500 rpm. for 30 minutes at 4°C.

Following centrifugation, the supernatant fluid (crude *N. gonorrhoeae* extract) is carefully decanted and stored at 4°C.

Further purification of the crude supernate extract (water soluble cellular components) is carried out by centrifugation of 10 ml. of the extract at 40,000 rpm. for 3 hrs. in an ultracentrifuge. Following centrifugation, the supernatant fluid is carefully decanted and stored at 4°C.

b. A 50% solids latex suspension consisting of carboxylated styrene butadiene copolymer (Dow No. 816) is diluted with distilled water to 5% solids. The resulting material is washed 2 times with distilled water by centrifugation at 15,000 rpm. After the last washing, the resin is resuspended in water to a final concentration of 5% solids. One volume of the soluble cellular gonococcal extract (from either the $T_1$ or $T_4$ variant), containing 3–17 mg./ml. of protein, is added to 4 volumes of the washed latex suspension. One volume of a freshly prepared 1% water solution of 1-cyclohexyl-3-(2-morpholinoethyl)-carbodiimide metho-p-toluenesulfonate is added to the protein-latex mixture under constant stirring at room temperature. The reaction mixture is incubated under constant agitation for 3 to 16 hrs. The resulting coupled latex is washed 2 times with distilled water by centrifugation at 15,000 rpm.

The supernatant is decanted and the resulting product is recovered. It is a white clay-like mass composed of particles coated with water soluble cellular components from *N. gonorrhoeae*. The particles have a size of about 0.20–0.25 $\mu$ and a specific gravity of 1.01.

The product is suspended in distilled water or saline solution buffered with 0.02M Tris to a pH of 7.5. The concentration of the product is adjusted to 2–3%. Other buffers can be used containing 0.1M glycine, 0.1 M imidazole, 1% bovine albumin, 0.1% polyvinyl pyrrolidinone or combinations thereof. Buffers having a pH of from 6.0 to 8.2 are satisfactory.

The product is packaged into a diagnostic reagent test kit having a container which contains an aqueous buffered antigen-carrier suspension at a concentration of about 2.5% by weight. The container contains about 1 to 10 ml. of reagent.

EXAMPLE 5

A diethylaminoethyl cellulose column is equilibrated with 0.02M Tris-NaCl buffer pH 7.5 (0.05M NaCl). The supernatant from extract prepared in Example 4*a* is dialyzed against the Tris-NaCl buffer and the solution added to the column. A stepwise elution from the column with buffers of constant pH (7.5) but increasing ionic strength results in fractions coming off the column between 0.1 and 0.2M NaCl. The fractions migrate in the range of $\alpha$ globulins in agar electrophoresis. Preparations of a latex conjugate with these fractions are accomplished in an identical manner as in Example 4*b* for the extract obtained after centrifugation and the products have the same physical characteristics. These latex coupled fractions give a positive agglutination test with sera from a large number of patients infected with *N. gonorrhoeae*.

I claim:

1. A water-insoluble immunological diagnostic reagent having a specific gravity of about that of water comprising discrete particles of a serologically inert latex polymer selected from the group consisting of carboxylated styrene butadiene, carboxylated polystyrene, carboxylated polystyrene with amino groups, acrylic acid polymers, methacrylic acid polymers, acrylonitrile butadiene styrene, polyvinyl acetate acrylate, polyvinyl pyridine and vinyl-chloride acrylate having condensed thereto, with a water soluble carbodiimide coupling agent, through an amide linkage, from about 0.01 to about 15.0% by weight of a known serologically determinant material selected from the group consisting of human chorionic gonadotropin and human gamma globulin.

2. The reagent of claim 1 wherein said serologically inert latex polymer is a water insoluble carboxylated styrene butadiene copolymer having a specific gravity of about that of water and a particle size of about 0.01 to about 0.9 microns.

3. The reagent of claim 1 wherein the serologically determinant material is human chorionic gonadotropin.

4. The reagent of claim 1 wherein the serologically determinant material is denatured human gamma globulin.

5. A method of detecting the presence of chorionic gonadotropin in human body fluids which comprises mixing the test fluid with antiserum for chorionic gonadotropin, then contacting the mixture with an aqueous suspension of the water-insoluble reagent of claim 3 and observing the results.

6. A method of detecting the presence of rheumatoid factor in human body fluids which comprises mixing the test fluid with an aqueous suspension of the water-insoluble reagent of claim 4 and observing the results.

* * * * *

Dedication 3,857,931.—*Hans Jacob Hager*, New York, N.Y. LATEX POLYMER REAGENTS FOR DIAGNOSTIC TESTS. Patent dated Dec. 31, 1974. Dedication filed July 20, 1977, by the assignee, *Hoffmann-La Roche Inc.*

Hereby dedicates to the Public the entire remaining term of said patent.

[*Official Gazette August 23, 1977.*]